US012701547B2

(12) United States Patent
Shi et al.

(10) Patent No.: US 12,701,547 B2
(45) Date of Patent: Aug. 4, 2026

(54) METHOD AND APPARATUS FOR PAGING

(71) Applicant: Lenovo (Beijing) Limited, Beijing (CN)

(72) Inventors: Jie Shi, Beijing (CN); Lianhai Wu, Beijing (CN); Ran Yue, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 307 days.

(21) Appl. No.: 18/290,199

(22) PCT Filed: May 10, 2021

(86) PCT No.: PCT/CN2021/092738
§ 371 (c)(1),
(2) Date: Nov. 10, 2023

(87) PCT Pub. No.: WO2022/236568
PCT Pub. Date: Nov. 17, 2022

(65) Prior Publication Data
US 2024/0357551 A1      Oct. 24, 2024

(51) Int. Cl.
*H04W 68/02*        (2009.01)
*H04W 76/27*        (2018.01)

(52) U.S. Cl.
CPC ........... *H04W 68/02* (2013.01); *H04W 76/27* (2018.02)

(58) Field of Classification Search
CPC ... H04W 68/02; H04W 76/27; H04W 68/025; H04W 68/005; H04W 72/23;
(Continued)

(56) References Cited

U.S. PATENT DOCUMENTS

| | | | |
|---|---|---|---|
| 2013/0015953 A1* | 1/2013 | Hsu .......................... | H04W 4/08 340/7.46 |
| 2020/0245246 A1* | 7/2020 | Dhanda ................. | H04W 76/27 |

(Continued)

FOREIGN PATENT DOCUMENTS

| | | |
|---|---|---|
| CN | 109923915 A | 6/2019 |
| WO | 2020147122 A1 | 7/2020 |

(Continued)

OTHER PUBLICATIONS

"Extended European Search Report", EP Application No. 21941144. 4, Dec. 13, 2024, 8 pages.

(Continued)

*Primary Examiner* — Nimesh Patel
(74) *Attorney, Agent, or Firm* — FIG. 1 Patents

(57)      ABSTRACT

Embodiments of the present application are related to a method and apparatus for paging. An exemplary method includes: receiving, in a user equipment (UE), UE grouping information from a network node, wherein the UE grouping information indicates UE group identity (ID) information or UE group set information; and in the case that a paging grouping mechanism is enabled for the UE, detecting group_ID indication information carried in at least one of paging physical downlink control channel (PDCCH) and paging early indication (PEI); or in the case that the paging grouping mechanism is disabled for the UE, not detecting the group_ID indication information carried in the at least one of the paging PDCCH and the PEI.

20 Claims, 7 Drawing Sheets

(58) Field of Classification Search
CPC ....... H04W 48/18; H04W 4/70; H04W 60/04; H04W 48/16; H04W 76/18; H04W 74/0838; H04W 76/30; H04W 76/11; H04W 84/042; H04W 4/08; H04W 76/10; H04W 52/0235; H04W 68/00; H04W 76/12; H04W 88/02; H04W 72/232; H04W 72/02; H04W 72/30; H04W 52/0274; H04W 76/20; H04W 76/40; H04W 76/14; H04W 76/19; H04W 72/04; H04W 72/21; H04W 76/25; H04W 72/20; H04W 76/38; H04W 72/27; H04W 76/23; Y02D 30/70; H04L 5/0053; H04L 5/0094; H04L 5/0048; H04L 5/0007; H04L 1/1812; H04L 65/1016; H04L 41/0895; H04L 5/0055; H04L 12/1407; H04L 41/0894; H04L 25/0226; H04L 41/0681; H04L 41/40; H04L 41/5054; H04L 43/0876; H04L 43/16; H04L 43/20; H04L 5/0058; H04L 1/1861; H04L 27/2666; H04L 2209/80; H04L 12/2854; H04B 7/00; H04B 7/0413; H04B 7/06952; H04B 17/318; H04B 7/0695; H04B 7/14; H04B 7/15542; H04B 7/0452; H04B 7/0617; H04B 7/024; H04B 7/0626; H04B 17/328; H04B 17/336; H04B 17/382; H04B 7/088; H04B 7/0697; H04B 7/06966; H04M 15/66; H04M 11/04; H04M 15/57; H04M 15/49; H04M 15/60; H04M 15/8016; H04J 11/00; H04J 11/0026; H04J 11/005; H04J 11/0056; H04J 11/0079

See application file for complete search history.

(56) References Cited

U.S. PATENT DOCUMENTS

| | | | | |
|---|---|---|---|---|
| 2022/0095094 | A1* | 3/2022 | Shi | H04W 68/02 |
| 2022/0377671 | A1* | 11/2022 | Höglund | H04W 68/00 |
| 2023/0300789 | A1* | 9/2023 | Hwang | H04W 68/005 370/329 |
| 2024/0430856 | A1* | 12/2024 | Shrivastava | H04W 72/1263 |

FOREIGN PATENT DOCUMENTS

| | | |
|---|---|---|
| WO | 2020157261 A1 | 8/2020 |
| WO | 2021066726 A1 | 4/2021 |

OTHER PUBLICATIONS

Catt, "UE sub-grouping mechanism with Paging Enhancement", 3GPP TSG-RAN WG2 Meeting #113 bis electronic, R2-2102919, Online, Apr. 2021, 4 pages.

PCT/CN2021/092738 , "International Preliminary Report on Patentability", PCT Application No. PCT/CN2021/092738, Nov. 23, 2023, 5 pages.

PCT/CN2021/092738 , "International Search Report and Written Opinion", PCT Application No. PCT/CN2021/092738, Feb. 11, 2022, 6 pages.

Qualcomm Incorporated , "Paging enhancements for idle/inactive UE power saving", 3GPP TSG-RAN WG1 #104-bis-e, R1-2103177, e-Meeting [retrieved Jan. 26, 2024]. Retrieved from the Internet <https://www.3gpp.org/ftp/TSG_RAN/WG1_RL1/TSGR1_104b-e/ Docs/>, Apr. 2021, 9 pages.

* cited by examiner

METHOD AND APPARATUS FOR PAGING

TECHNICAL FIELD

Embodiments of the present application generally relate to wireless communication technology, and more specifically relates to enhancing paging technology to save user equipment (UE) power.

BACKGROUND OF THE INVENTION

Wireless communication networks have grown rapidly over the years. The next generation wireless communication system 5G is an example of an emerging telecommunication standard. New radio (NR) is generally a set of enhancements to the long term evolution (LTE) mobile standard promulgated by the 3rd generation partnership project (3GPP). 5G and/or NR networks are expected to increase throughput, coverage, and robustness and reduce latency and operational and capital expenditures.

With the development of the 5G system, various aspects need to be studied to perfect the 5G/NR technology. For example, Rel-17 RP-193264 and RP-192673 respectively specify objectives for UE power saving by reducing unnecessary UE paging receptions and enhancing paging indication etc.

However, due to complicated factors in a wireless communication network, how to provide an improved paging mechanism for UE power saving, which can work well under various conditions should be seriously considered.

BRIEF SUMMARY OF THE INVENTION

One objective of the embodiments of the present application is to provide a solution for paging, which can at least support network controlled grouping.

According to some embodiments of the present application, a method may include: receiving, in a user equipment (UE), UE grouping information from a network node, wherein the UE grouping information indicates UE group identity (ID) information or UE group set information; and in the case that a paging grouping mechanism is enabled for the UE, detecting group_ID indication information carried in at least one of paging physical downlink control channel (PDCCH) and paging early indication (PEI); or in the case that the paging grouping mechanism is disabled for the UE, not detecting the group_ID indication information carried in the at least one of the paging PDCCH and the PEI.

In some embodiments of the present application, the UE grouping information indicates the UE group ID information or UE group set information of at least one of: UEs in an inactive mode and UEs in an idle mode. For example, the UE grouping information indicates UE group ID information or UE group set information of UEs in a dedicated area, wherein the dedicated area is a cell-specific area, a base station (BS)-specific area, a radio access network (RAN)-specific area, tracking area (TA)-specific area, or a public land mobile network (PLMN)-specific area.

In some embodiments of the present application, the UE grouping information is commonly configured for the UEs in an inactive mode and the UEs in an idle mode, or is separately configured for the UEs in an inactive mode and the UEs in an idle mode.

In some embodiments of the present application, the UE grouping information indicates the UE group ID information or UE group set information by indicating range information of UEs in a number of UE groups.

For example, in the case that the UE grouping information indicates at least one number range [x y] for UEs associated with a UE characteristic in a number of UE groups, the UE group ID information or UE group set information of the UE will be computed based on a formulation [floor(x*N), floor (y*N)], wherein 0<=x<y(<=1, both x and y are present in decimal or percent, and N is the number of UE groups and is an integer equal to or larger than 1. In the case that floor(Y*N)<N, Y is a largest number of the at least one number range [x y], the group from Y or (Y+1) to N will be determined to be in a separate group set or to be in a group set as the same as Y. In the case that floor(x*N)=floor(y*N), there is only one UE group ID.

In another example, in the case that the UE grouping information indicates a range set $(x_1, \ldots x_m)$ of at least one range unit $[x_1\ x_2] \ldots$ and $[x_{m-1}\ x_m]$ for UEs associated with a UE characteristic in a number of UE groups, the UE group ID information or UE group set information of the UE will be computed by one of the following:

floor[0, $x_1$*N), floor[$x_1$*N, $x_2$*N), . . . , floor[$x_{m-1}$*N, $x_m$*N), and floor[$x_m$*N, 1*N];

floor[$x_1$*N, $x_2$*N), . . . , floor[$x_{m-1}$*N, $x_m$*N), and floor [$x_m$*N, 1*N];

floor[0, $x_1$*N), floor[$x_1$*N, $x_2$*N), . . . , and floor[$x_{m-1}$*N, $x_m$*N]; and floor[$x_1$*N, $x_2$*N), . . . , and floor[$x_{m-1}$*N, $x_m$*N], wherein, 0<=$x_1$, . . . $x_m$<=1, and $x_1$, . . . $x_m$ are present in decimal or percent, N is the number of UE groups, and both m and N are integer equal to or larger than 1.

In some embodiments of the present application, the method may include: disabling the paging grouping mechanism in the case that the UE moves to an idle mode from an inactive mode. In some other embodiments of the present application, the method may include: detecting the group_ID indication information associated with an idle mode in response to at least one of the following: the UE moves to an idle mode from an inactive mode; and a timer expires. In some yet other embodiments of the present application, the method may include: detecting the group_ID indication information associated with an inactive mode in response to at least one of the following: the UE moves to an inactive mode from an idle mode; and a timer is running or not expired. The timer is triggered in response to that the UE moves to the idle mode from the inactive mode, wherein the timer is a RAN-based notification area (RNA) timer or a timer configured by a network side.

In some embodiments of the present application, the method may include: in the case that UE grouping information in a cell is received, applying the UE grouping information in the cell.

In some embodiments of the present application, the method may include: computing the UE group ID information or UE group set information of the UE in a cell based on a mapping rule, wherein the mapping rule of UE characteristic to UE groups in the cell indicates a mapping order, and the mapping order is row first or column first.

In some embodiments of the present application, the method may include: receiving an indication on whether a RAN node follows the UE grouping information configured by a core network node in system information or in a radio resource control (RRC) message.

In some embodiments of the present application, the network node is a RAN node or a core network node.

According to some other embodiments of the present application, a method may include: receiving information on UE paging grouping in a first network node from a second network node; and transmitting UE grouping information from the first network node, wherein the UE grouping information indicates UE group ID information or UE group set information.

In some embodiments of the present application, the method may include: receiving or transmitting statistic information, wherein the statistic information includes one of the following: at least one number of UEs in at least one of a power saving mode, in an inactive mode, in an idle mode, and in a paging probability zone in a dedicated area; at least one percent of UEs in at least one of a power saving mode, in an inactive mode, in an idle mode, and in a paging probability zone in a dedicated area; and at least one level of UEs in at least one of a power saving mode, in an inactive mode, in an idle mode, and in a paging probability zone in a dedicated area. In some other embodiments of the present application, the method may include: determining PEI configuration based on the statistic information.

In some embodiments of the present application, the method may include: transmitting a mapping rule of UE characteristic to UE groups in a cell configured by a RAN node. In some other embodiments of the present application, the method may include: transmitting a mapping rule of UE characteristic to UE groups in a cell configured by a core network node. The mapping rule of UE characteristic to UE groups in a cell indicates a mapping order, and the mapping order is row first or column first.

In some embodiments of the present application, the method may include: transmitting an indication on whether a RAN node follows the UE grouping information configured by a core network node in system information or in a RRC message.

In some embodiments of the present application, the information on UE paging grouping may include at least one of the following: a capability on PEI; a current PEI configuration information in a cell; a maximum number of UE groups in a cell; and a minimum number of UE groups in a cell.

In some embodiments of the present application, the method may include: transmitting suggestion information on the UE grouping information from the first network node to the second network node. The suggestion information may include at least one of: suggested PEI configuration information in the cell, a suggested maximum number of UE groups in the cell and a suggested minimum number of UE groups in the cell.

In some embodiments of the present application, the first network node is a core network node, and the second network node is a base station. In some other embodiments of the present application, the first network node is a base station, and the second network node is a core network node. In some yet other embodiments of the present application, the first network node is an anchor base station, and the second network node is a neighbor base station of the anchor base station.

According to some yet other embodiments of the present application, a method may include: transmitting information on UE paging grouping in a first network node to a second network node or to UEs; and receiving or determining UE grouping information in the first network node, wherein the UE grouping information indicates UE group ID information or UE group set information.

In some embodiments of the present application, the first network node is a base station, and the second network node is an anchor base station of the base station.

In some embodiments of the present application, the method may include: receiving the UE grouping information in the first network node by a RAN paging message or by a core network paging message.

In some embodiments of the present application, the method may include: receiving UE assistant information in the first network node by a RAN paging message or by a core network paging message, wherein the UE assistant information includes UE characteristic information.

Some embodiment of the present application provide an apparatus. The apparatus includes at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any method according to an embodiment of the present application with the at least one receiving circuitry and the at least one transmitting circuitry.

Embodiments of the present application can improve the paging mechanism, support network controlled paging, and efficiently reduce unnecessary paging receptions. Accordingly, embodiments of the present application will facilitate the deployment and implementation of NR.

BRIEF DESCRIPTION OF THE DRAWINGS

In order to describe the manner in which advantages and features of the present application can be obtained, a description of the present application is rendered by reference to specific embodiments thereof which are illustrated in the appended figures. These figures depict only example embodiments of the present application and are not therefore to be considered as limiting of its scope.

DETAILED DESCRIPTION OF THE INVENTION

The detailed description of the appended figures is intended as a description of the currently preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE, and so on. It is contemplated that along with the developments of network architectures and new service scenarios, all embodiments in the present application are also applicable to similar technical problems. Moreover, the terminologies recited in the present application may change, which should not affect the principle of the present application.

Figure 1:
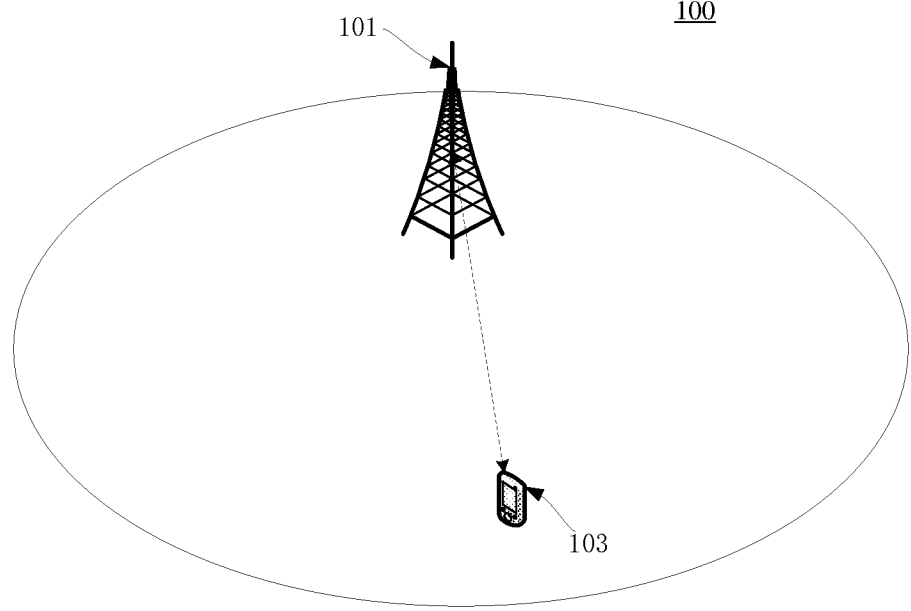
FIG. 1 illustrates a schematic diagram of an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 can include at least one base station (BS) 101 and at least one UE 103. Although a specific number of BSs 101 and UEs 103, e.g., only one BS 101 and one UE 103, are depicted in FIG. 1, one skilled in the art will recognize that any number of BSs 101 and UEs 103 may be included in the wireless communication system 100.

The BS 101 may be distributed over a geographic region, and generally may be a part of a radio access network that may include one or more controllers communicably coupled to one or more corresponding BSs 101. In some embodiments of the present application, each BS 101 may also be referred to as an access point, an access terminal, a base, a macro cell, a Node-B, an evolved Node B (eNB), a gNB, a Home Node-B, a relay node, a device, or described using other terminology used in the art.

According to some embodiments of the present application, the UE 103 may be a computing device, such as a desktop computer, a laptop computer, a personal digital assistant (PDA), a tablet computer, a smart television (e.g., a television connected to the Internet), a set-top box, a game console, a security system (including a security camera), a vehicle on-board computer, a network device (e.g., a router, a switch, or a modem), or the like. According to some other embodiments of the present application, the UE 103 may be a portable wireless communication device, a smart phone, a cellular telephone, a flip phone, a device having a subscriber identity module, a personal computer, a selective call receiver, or any other device that is capable of sending and receiving communication signals on a wireless network. According to some other embodiments of the present application, the UE 103 may be a RedCap UE.

In addition, the UE 103 may also be referred to as a subscriber unit, a mobile, a mobile station, a user, a terminal, a mobile terminal, a wireless terminal, a fixed terminal, a subscriber station, a user terminal, or a device, or described using other terminology used in the art.

Regarding UE power saving, especially for UE(s) in an idle mode or inactive mode, reducing unnecessary UE paging receptions is an effective and practicable manner. To reduce wrong paging alarm(s), according to embodiments of the present application, different strategies can be applied to enhance paging indication. For example, a wake up signal (WUS) mechanism is introduced for power saving in LTE Rel-15, wherein a WUS indicates whether there is a paging process in a pre-defined paging occasion (PO). Specifically, when the WUS mechanism is disabled, a UE always monitors paging messages on POs. When the WUS mechanism is enabled, the UE monitors the following possible paging messages in POs in response to the UE detecting a WUS, so that physical downlink control channel (PDCCH) blind detection can be performed. On the other hand, when the WUS mechanism is enabled, the UE will not monitor the following paging messages in POs in response to the UE not detecting any WUS. To reduce false alarm probability, in narrow band internet of things (NB-IoT)/enhanced machine-type communication (eMTC) R16 WI, a group WUS mechanism is applied to further reduce the false paging alarm.

According to Rel-17, paging early indication (PEI) or paging PDCCH or downlink control information (DCI) in PDCCH could be used to indicate the paging group ID information. A UE will be allocated to different paging groups based on the paging group ID computed by a UE-ID based grouping rule or UE-paging-probability based grouping rule etc. Regarding the paging PDCCH, the UE will not decode the physical downlink shared channel (PDSCH) indicated in the paging PDCCH to check the record identity (ID) list for paging in the PDSCH when there is no its own ID in the record ID list, so that its power is saved. Regarding PEI, in RAN1 #104e, the following are agreed:

For the evaluation and comparison of PEI candidate designs based on PDCCH, TRS/CSI-RS and SSS, the following are assumed:

Behv-A:

PEI indicates UE should monitor a PO if UE's group subgroup is paged

UE is not required to monitor a PO if UE does not detect PEI at all PEI occasion(s) for the PO Behv-B:

PEI indicates whether or not UE should monitor a PO

UE is required to monitor a PO if UE does not detect PEI at all PEI occasion(s) for the PO.

In addition, according to RAN2 #113bis-e meeting, a network controlled subgrouping (or grouping) mechanism will be adopted for paging, which is based on individual UE characteristics, not specified or limited to paging probability (PP) as evolved universal terrestrial radio access (EUTRA), possibly with additional randomization. However, how to implement the network controlled grouping for paging needs to be further studied.

Considering the network controlled grouping mechanism, embodiments of the present application provide a technical solution at least for paging in NR, which will be illustrated in the following text in combination with the appended drawings.

Figure 2:
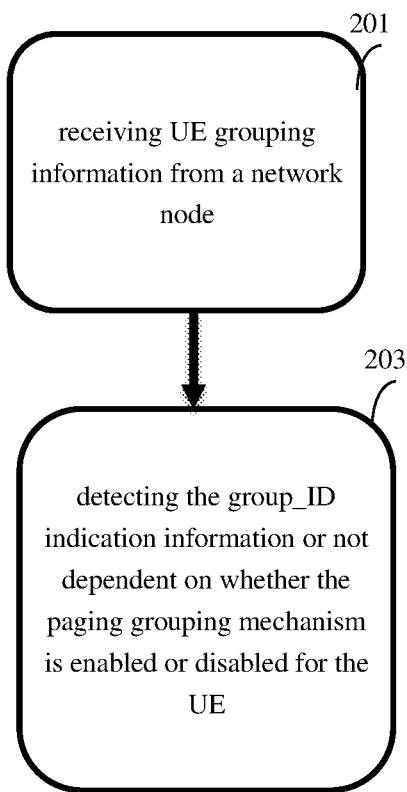
FIG. 2 illustrates an exemplary flow chart of a method for paging according to some embodiments of the present application.

FIG. 2 illustrates an exemplary flow chart of a method for paging according to some embodiments of the present application; a method for paging according to some embodiments of the present application. The illustrated method can be implemented in the remote side, e.g., in a UE or the like.

According to some embodiments of the present application, a network controlled grouping mechanism can be implemented by a core network (CN) based grouping manner or a RAN based grouping manner. A network node, e.g., a CN function entity (or CN node), or a RAN node may configure the UE grouping information, and then transmit the UE grouping information to the UE. The CN function entity (or CN node) may be an access and mobility management function (AMF) or mobility management entity (MME). The RAN node may be a BS (e.g., gNB), e.g., an anchor gNB or a serving gNB etc.

Referring to FIG. 2, in the remote side, in step 201, the UE grouping information is received from a network node, e.g., an AMF or a gNB. The UE grouping information indicates UE group ID information or UE group set information. For example, the UE grouping information may indicate UE group ID information or UE group set information of at least one of: UEs in an inactive mode and UEs in an idle mode.

In another example, the UE grouping information may indicate the UE group ID information or UE group set information of at least one of: UEs in an inactive mode and UEs in an idle mode in a dedicated area. The dedicated area is a cell-specific area, a BS-specific area, a RAN-specific area, TA-specific area, or a PLMN-specific area etc.

In some embodiments of the present application, the UE grouping information indicates the UE group ID information or UE group set information by indicating range information of UEs in a number of UE groups. For example, the UE grouping information may indicate at least one number range for UEs associated with a UE characteristic in a number of UE groups, or indicate a range set of at least one range unit for UEs associated with a UE characteristic in a number of UE groups. The UE will compute its group ID information or group set information based on the UE grouping formation.

In some embodiments of the present application, a UE characteristic may be a combination of one or more UE characteristics. For example, a UE characteristic may be a combination of UE paging probability information and UE power sensitive information. The UE characteristic may be but not limited to the UE paging probability information, UE power sensitive information, UE mobility information, or UE idle or inactive mode information.

For example, in some embodiments of the present application, the UE grouping information may indicate at least one number range [x y] for UEs associated with a UE characteristic in a number of UE groups. The at least one number range [x y] of UE group ID set is discrete or continuous, and covers the entire range [0 100%] of UE group ID set for UEs associated with the UE characteristic or only part of the entire range [0 100%] of UE group ID set for UEs associated with the UE characteristic. For example, the UE grouping information may indicate [10% 30%] and [60% 80%]; or indicate [0 20%], (20 60%], and (60% 100%] etc.

The UE group ID information or UE group set information of a UE will be computed based on a formulation [floor(x*N), floor(y*N)], wherein $0<=x<y<=1$, both x and y are present in decimal or percent, and N is the number of UE groups and is an integer equal to or larger than 1. The upper value and bottom value of each range can be grouped into the same group set (or group) as other value(s) within the range or be grouped into a previous group set (or group) or a next group set (or group) based on a rule. For example, in the case that floor(Y*N)<N, Y is the largest number of the at least one number range [x y], the group from Y or (Y+1) to N will be determined to be in a separate group set (or group) or to be in a group set (or group) as the same as Y. In the case that floor(x*N)=floor(y*N), there is only one UE group ID.

In an exemplary embodiment of the present application, the AMF may configure a range [0, 0.5) to UEs with a characteristic of paging probability (PP)<=0.5, and configure a range [0.5, 1] to UEs with a characteristic of paging probability >0.5, wherein "0" of UEs associated with the characteristic will be grouped into the group determined by the range [0 0.5], while "0.5" of UEs associated with the characteristic will be grouped in the next group which is determined by the range [0.5, 1].

For another example, the UE grouping information may indicate a range set $(x_1, \ldots x_m)$ of at least one range unit $[x_1\ x_2] \ldots$ and $[x_{m-1}\ x_m]$ for UEs associated with a UE characteristic in a number of UE groups. The UE group ID information or UE group set information indicated by each range unit can be computed in the same way as that illustrated above for each range. The upper value and bottom value of each range unit can be grouped into the same group set (or group) as other value(s) of the range unit or be grouped into a previous group set (or group) or a next group set (or group). For example, the UE group ID information or UE group set information of a UE may be computed by one of the following:

floor[0, $x_1$*N), floor[$x_1$*N, $x_2$*N), . . . , floor[$x_{m-1}$*N, $x_m$*N), and floor[$x_m$*N, 1*N];

floor[$x_1$*N, $x_2$*N), . . . , floor[$x_{m-1}$*N, $x_m$*N), and floor [$x_m$*N, 1*N];

floor[0, $x_1$*N), floor[$x_1$*N, $x_2$*N), . . . , and floor[$x_{m-1}$*N, $x_m$*N]; and floor[$x_1$*N, $x_2$*N), . . . , and floor[$x_{m-1}$*N, $x_m$*N], wherein, $0<=x_1, \ldots x_m<=1$, and $x_1, \ldots x_m$ are present in decimal or percent, N is the number of UE groups, and both m and N are integer equal to or larger than 1.

In an exemplary embodiment of the present application, the AMF may configure a range set [0, 0.5, 1] to UEs with a characteristic of paging probability, wherein "0" of UEs associated with the characteristic will be grouped in the group determined by the range unit [0 0.5]; "0.5" of UEs associated with the characteristic will be grouped into the same group determined by the range unit [0 0.5], or be grouped into a next group which is determined by the range unit [0.5, 1]; and "1" of UEs associated with the characteristic will be grouped into the group determined by the range unit [0.5 1] or be grouped in a separate group (which will be the last group).

The number of UE groups may be cell-specific in some embodiments of the present application, and the UE grouping information configured by the CN side may be not consistent with that configured in the cell.

In some embodiments of the present application, the floor function means to perform the floor operation to each element in a set. For example, floor[0, x1*N) means to perform the floor function to each element in the set [0, x1*N), or means [floor(0), floor(x1*N)).

In some embodiments of the present application, the floor operation may be replaced by the ceiling operation.

According to some embodiments of the present application, in the case that UE grouping information in the cell is received, a UE will apply the UE grouping information in the cell. The UE grouping information configured by the CN node will be ignored. According to some other embodiments of the present application, an indication on whether a RAN node follows the UE grouping information configured by a core network node will be indicated in system information or in a RRC message (or signaling), e.g., a RRC release message. Accordingly, the inconsistency between the UE grouping information configured by the CN node and the cell specific UE grouping information will be avoided.

In some embodiments of the present application, to ensure UEs have correct UE grouping information in a cell, a mapping rule for the UE grouping information allocated by the CN side and the UE grouping information in a cell configured by a BS is introduced. The mapping rule is predefined, or is configured by a CN node, e.g., an AMF, or is configured by a RAN node, e.g., a BS. The mapping rule may indicate a mapping order, e.g., row first or column first. In some embodiments of the present application, a starting value of the mapping rule may be fixed, which may be predefined or be indicated by a CN node or a gNB. In some embodiments of the present application, the starting value may be configured to UEs, or computed based on some functions. In some other embodiments of the present application, the starting value may be considered as the default first UE group ID. UE group ID information or UE group set information of a UE in a cell will be computed based on the mapping rule.

For example, an AMF assumes that generally, a gNB will support at least 10 UE groups in a RNA, and configure UE grouping information indicating that: UE group ID information (0, 1) is for PP [0, 0.1], UE group ID information (2, 3) is for PP [0.1, 0.4], UE group ID information (3, 4, 5) is for PP [0.4, 0.8], and UE group ID information (5, 6, 7, 8, 9) is for PP [0.8, 1]. However, for a specific gNB, the maximum UE group number in a specific cell is 20. The UE grouping information based on 10 UE groups configured by the AMF should be mapped into the UE grouping information based on 20 UE groups in the specific cell according to a mapping rule. For example, the UE group ID in the cell (configured by the gNB) will be ordered for the UE group ID in the network (configured by the AMF) based on a mapping order. A UE that is not configured a UE group ID in the cell will be grouped into a default UE group.

In the case that a row first mapping order is adopted and "1" is the starting value, the 10 UE group IDs in the network, e.g., 1 2 3 4 5 6 7 8 9 10, will be mapped into the 20 UE group IDs in the cell as follows:

| | | | | | | | | | |
|---|---|---|---|---|---|---|---|---|---|
| 1, 2, 3, 4, 5, 6, 7, 8, 9, 10 | | | | | | | | | |
| 11, 12, 13, 14, 15, 16, 17, 18, 19, 20 | | | | | | | | | |

That means, the UE with group ID 1 in the network will be mapped to the UE group (1,11) in the cell, the UE with group ID 2 in the network will be mapped to the UE group (2, 12) in the cell, and so on. The length of the row is the number of UE groups assumed by the AMF.

In the case that a column first mapping order is adopted and "1" is the starting value, the 10 UE group IDs in the network, e.g., 1 2 3 4 5 6 7 8 9 10, will be mapped to the 20 UE group ID in the cell as follows:

| 1 | 3 | 5 | 7 | 9 | 11 | 13 | 15 | 17 | 19 |
|---|---|---|---|---|---|---|---|---|---|
| 2 | 4 | 6 | 8 | 10 | 12 | 14 | 16 | 18 | 20 |

That means, the UE with group ID 1 in the network will be mapped to the UE group (1, 2) in the cell, the UE with group ID 2 in the network will be mapped to the UE group (3, 4) in the cell, and so on. The number of rows in the first column is determined by a formula floor($N_{ran}/N_{cn}$)/ceil ($N_{ran}/N_{cn}$), wherein $N_{cn}$ is the total number of UE group IDs in the network, and $N_{ran}$ is the total number of UE groups in the cell.

The network side may also transmit to the UE at least one of paging PDCCH and PEI, e.g., by the CN node or RAN node, wherein the at least one paging PDCCH and PEI carries group_ID indication information of a set of UE for which a paging grouping mechanism is enabled. After receiving the at least one of paging PDCCH and PEI, whether the UE decodes (or detect, or monitor, or the like) the group_ID indication information or not depends on whether the paging grouping mechanism is enabled or disabled for the UE. Specifically, in the case that the paging grouping mechanism is enabled for the UE, the UE will detect the group_ID indication information carried in at least one of the paging PDCCH and PEI in step 203. Otherwise, in the case that the paging grouping mechanism is disabled for the UE, the UE will not detect the group_ID indication information carried in the at least one of the paging PDCCH and the PEI in step 203. Accordingly, the UE for which the paging grouping mechanism is disabled will not perform unnecessary paging reception, and thus its power will be saved.

In some embodiments of the present application, the UE may disable the paging grouping mechanism in the case that the UE moves to an idle mode from an inactive mode. In some other embodiments of the present application, the UE may detect the group_ID indication information associated with an idle mode in response to at least one of the following: the UE moves to an idle mode from an inactive mode, and a timer expires. In some yet other embodiments of the present application, the UE may detect the group_ID indication information associated with an inactive mode in response to at least one of the following: the UE moves to an inactive mode from an idle mode, and a timer is running or not expired. The timer is triggered in response to that the UE moves to the idle mode from the inactive mode, wherein the timer is a RNA timer or a timer configured by a network side, e.g., a CN node or a BS. For example, the timer configured by the network side may be T380 plus a offset, wherein the offset may be zero in some embodiments of the present application.

Regarding how the UE grouping information is configured and how the UE group ID information or UE group set information of a UE is determined (or computed), more embodiments of the present application will be illustrated in view of the network side. Considering the consistency between the receiver (reception side) and transmitter (transmission side), although some embodiments are illustrated only in the receiver or transmitter, persons skilled in the art should totally understand the correspondence adaptive to the other side.

Figure 3:
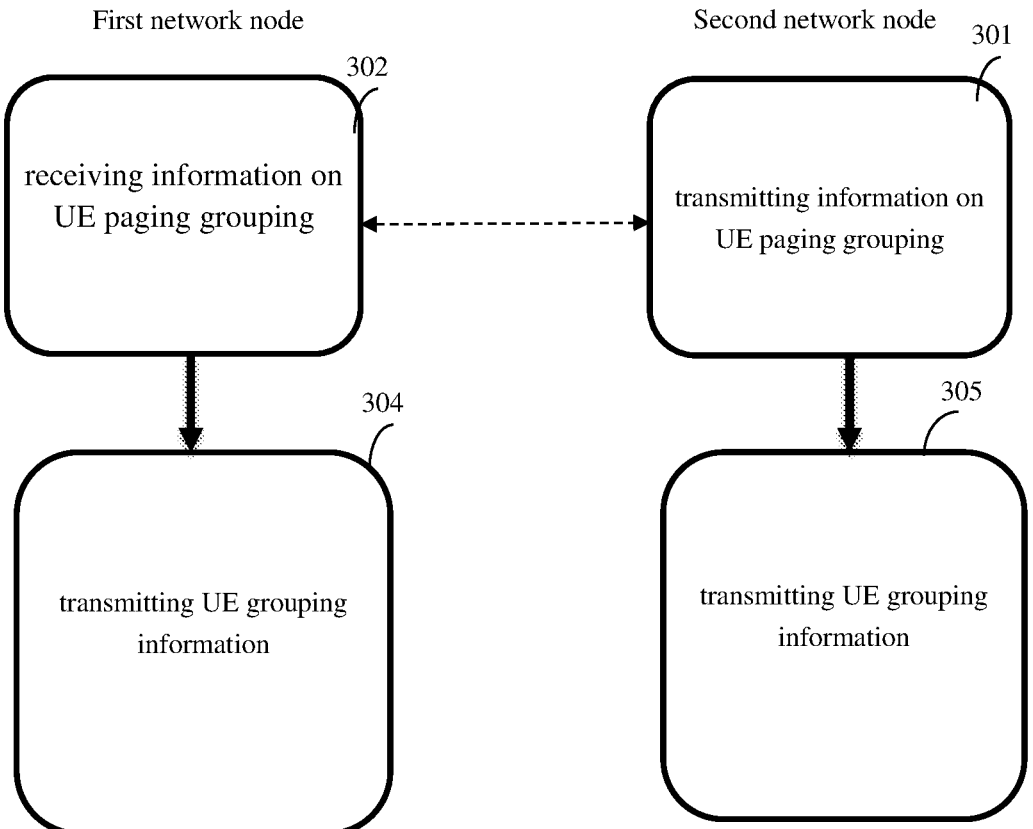
FIG. 3 illustrates an exemplary flow chart of a method for paging according to some embodiments of the present application.

FIG. 3 illustrates an exemplary flow chart of a method for paging according to some embodiments of the present application. Although the method is illustrated in a system level between two network nodes (e.g., a CN node and a RAN node, or two RAN nodes), persons skilled in the art would understand that the method implemented in each network node can be separately implemented and incorporated by other apparatus with the like functions. Herein (through the specification), wording "first" and "second" are only used for reciting two network nodes in a simple and clear manner, which should be deemed as limit to a specific network node.

As shown in FIG. 3, in step 301, a second network node may transmit information on UE paging grouping to a first network node. In some embodiments of the present application, the second network node may transmit the information on UE paging grouping to UEs. In some other embodiments of the present application, the second network node may transmit the information on UE paging grouping to UEs and the first network node, and even to other network node(s). In the case of the information on UE paging grouping being transmitted to the first network node, the information on UE paging grouping may be received in the first network node in step 302.

In some embodiments of the present application, the first network node is a CN node, e.g., an AMF and the second network node is a BS, e.g., an anchor gNB. In some other embodiments of the present application, the first network node is a BS, e.g., an anchor gNB, and the second network node is a CN node, e.g., an AMF. In some yet other embodiments of the present application, the first network node is an anchor BS, and the second network node is a neighbor BS of the anchor BS. The information on UE paging grouping can be any information associated with UE paging grouping, such as UE paging assistant information, or information on the wireless resource associated with UE grouping in a dedicated area (e.g., gNB group_ID information and the number of UE groups etc.), or statistic information of UEs. The UE paging assistant information may include UE characteristic information, e.g., paging probability etc. The statistic information of UEs may be statistic information of UE characteristic etc.

In some embodiments of the present application, part of the information on UE paging grouping may be stored in the first network node, and the first network node may transmit the stored information on UE paging grouping, to another network node (e.g., the second network node), that is, in some embodiments of the present application, the first network node and the second network node may exchange the information on UE paging grouping with each other or with other network node(s). For example, the first network node may receive statistic information (or distribution information) of UE characteristic from the second network node, or transmit the statistic information to the second network node. The statistic information can be used for determining PEI configuration by a network node, e.g., the first network node or the second network node. In some embodiments of the present application, the first network node may transmit UE assistant information by a RAN paging message or by a CN paging message to another network node (e.g., the second network node) or UEs. In some other embodiments of the present application, the first network node may receive UE assistant information by a RAN paging message or by a CN paging message from another network node (e.g., the second network node).

The first network node may determine the UE grouping information based on the information on UE paging grouping. In some embodiments of the present application, the first network node may receive the UE grouping information from another network node (may be the second network node). For example, the first network node is an anchor BS, and it may determine the UE grouping information over a dedicated area or receive the UE grouping information from a CN node. In some embodiments of the present application, the first network node may determine the UE grouping information based on the information on UE paging grouping and also receive UE grouping information from another network node (may be the second network node). For example, the first network node is an anchor BS, and it may determine the UE grouping information over a dedicated area and may also receive the UE grouping information from a CN node.

In step 304, the first network node will transmit the UE grouping information to another network node (may be the second network node) or UEs etc. The UE grouping information may indicate UE group ID information or UE group set information of at least one of: UEs in an inactive mode and UEs in an idle mode. For example, the UE grouping information may indicate UE group ID information or UE group set information of both UEs in an inactive mode and UEs in an idle mode in a dedicated area, e.g., in a cell-specific area, a BS-specific area, a RAN-specific area, TA-specific area, or a PLMN-specific area etc.

Regarding the second network node, it may receive the UE grouping information from another network node (may be the first network node). In some embodiments of the present application, the second network node may determine the UE grouping information based on the information on UE paging grouping. For example, the second network node is an anchor BS, and it may determine the UE grouping information over a dedicated area or receive the UE grouping information from a CN node. In some embodiments of the present application, the second network node may determine the UE grouping information based on the information on UE paging grouping and also receive UE grouping information from another network node (may be the first network node). For example, the second network node is an anchor BS, and it may determine the UE grouping information over a dedicated area and receive the UE grouping information from a CN node. In step 305, the second network node will transmit the UE grouping information to another network node (may be the first network node) or UEs etc.

In some embodiments of the present application, the information on UE paging grouping, which is transmitted from the second network node to the first network node, may include at least one of the following: a capability on PEI, a current PEI configuration information in a cell, a maximum number of UE groups in a cell, and a minimum number of UE groups in a cell. The first network node which receives the information on UE paging grouping may transmit suggestion information (or restriction information) on the UE grouping information to the second network node. For example, the suggestion information may include at least one of: suggested PEI configuration information in a cell, a suggested maximum number of UE groups in a cell and a suggested minimum number of UE groups in a cell. The second network side may determine PEI configuration based on the suggestion information.

The UE grouping information determined in the first network node or the second network node may be not consistent with that received from another network node. For example, the number of UE groups may be cell-specific, and the UE grouping information configured by the CN side (e.g., the AMF) may be not consistent with that configured in the cell (e.g., by a BS). Thus, a solution should be introduced to ensure UEs adopt the correct UE grouping formation.

According to some embodiments of the present application, an indication on whether a RAN node follows the UE grouping information configured by a CN node will be transmitted to UEs in system information or in a RRC message (or signaling), e.g., a RRC release message. In some embodiments of the present application, a mapping rule of UE characteristic to UE groups in a cell is configured by a RAN node or a CN node and is transmitted accordingly, which indicates a mapping order, e.g., row first or column first. In some embodiments of the present application, the mapping rule may also indicate a fixed starting value configured by the RAN node or CN node. The group ID information or group set information of a UE in a cell will be computed based on the mapping rule. Accordingly, the UE grouping information configured by the CN node and the cell specific UE grouping information will be consistent, and the UE will obtain the correct UE grouping information in a cell. In such embodiments, the behaviors of the first network node and second network node depend on whether they are a CN network node or a RAN node.

Based on the above basic solutions, some embodiments of the present application will be further illustrated in view of exemplary scenarios.

In an exemplary scenario, a network node, e.g., a BS or a CN function entity (or CN node) will determine UE grouping information based on UE paging assistant information (e.g., paging probability etc.) or other information, which is stored in the network node or another network node. However, the network node which determines UE grouping information for a dedicated area may have no idea on the wireless resource associated with UE grouping in a dedicated area. For example, the AMF which determines UE grouping information for the RAN side has no information on the number of the groups configured or supported by the gNB, e.g., an averaged number of UE groups will be supported by the gNB.

At least for solving the above problem, according to some embodiments of the present application, information on UE paging grouping, which includes information on the wireless resource associated with UE grouping, e.g., gNB group_ID information and the number of UE groups etc., will be transmitted and received between the RAN side and CN side or between an anchor BS and its neighbor BS to ensure that the network node that determines UE grouping information can control the grouping. For example, in the case that the AMF determines UE grouping information, an anchor gNB may report the AMF the information on the number of the UE groups configured by the anchor gNB, e.g., an averaged number of UE groups will be supported by the gNB.

Figure 4:
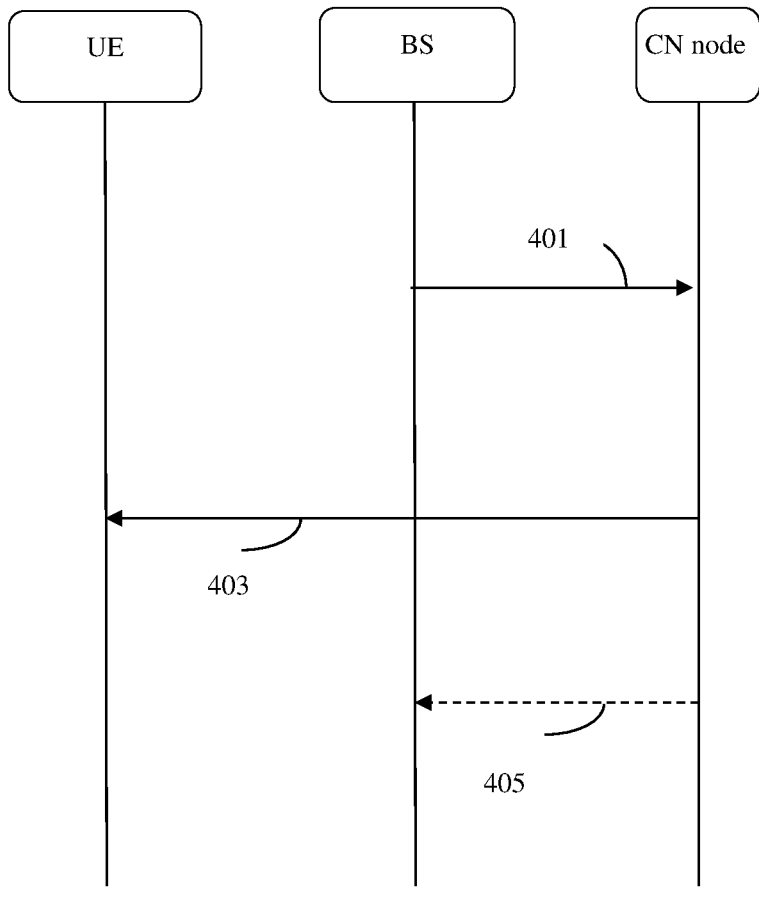
FIG. 4 illustrates an exemplary flow chart of a method for paging according to some embodiments of the present application.

Specifically, FIG. 4 illustrates an exemplary flow chart of a method for paging according to some embodiments of the present application, wherein a CN node or CN function entity, e.g., an AMF will determine UE grouping information. Although the method is illustrated in a system level by a UE in a remote side (or UE side) and two network nodes, e.g., a BS and an AMF, persons skilled in the art can understand that the method implemented in the remote side and that implemented in the two network nodes can be separately implemented and incorporated by other apparatus with the like functions.

As shown in FIG. 4, in step 401, a BS, e.g., an anchor gNB reports or transmits information on UE paging grouping in the BS to a CN function entity, e.g., an AMF, and the CN function entity receives the information on UE paging grouping accordingly. The information on UE paging grouping may include at least one of the following: a capability on PEI, e.g., the capability on PEI of the BS or another BS, a current PEI configuration information in a cell, a maximum number of UE groups in a cell, and a minimum number of UE groups in a cell. The cell is configured by the BS or by another BS, e.g., the neighbor BS of the anchor BS.

The CN function entity, e.g., the AMF may determine the UE grouping information for the RAN side based on the information on UE paging grouping. The AMF may transmit the UE grouping information to the remote side, e.g., UEs by a non-access stratum (NAS) message in step 403. The CN function entity, e.g., the AMF may also transmit the UE grouping information to the BS.

In some embodiments of the present application, the CN function entity, e.g., the AMF may transmit suggestion information (or restriction information) on the UE grouping information to the BS in step 405, which can be used as UE grouping configuration information for the RAN side or only for reference. The suggestion information may include at least one of: suggested PEI configuration information in the cell, a suggested maximum number of UE groups in the cell and a suggested minimum number of UE groups in the cell. The BS may determine the PEI configuration in the cell, e.g., the number of UE groups indicated by the PEI etc., based on the suggestion information.

For example, based on the information on UE paging grouping from the gNB, the AMF may determine that UEs with PP between 0.2-0.4 and with high power sensitivity will be in a UE group set, or determine UEs in an idle mode will be in a UE group set, or determines UEs in an inactive mode will be in a UE group set. The minimum number of UE groups in a dedicated area, e.g., in a RNA, or TA or cell is suggested to be larger than the numbers of UE groups.

Figure 5:
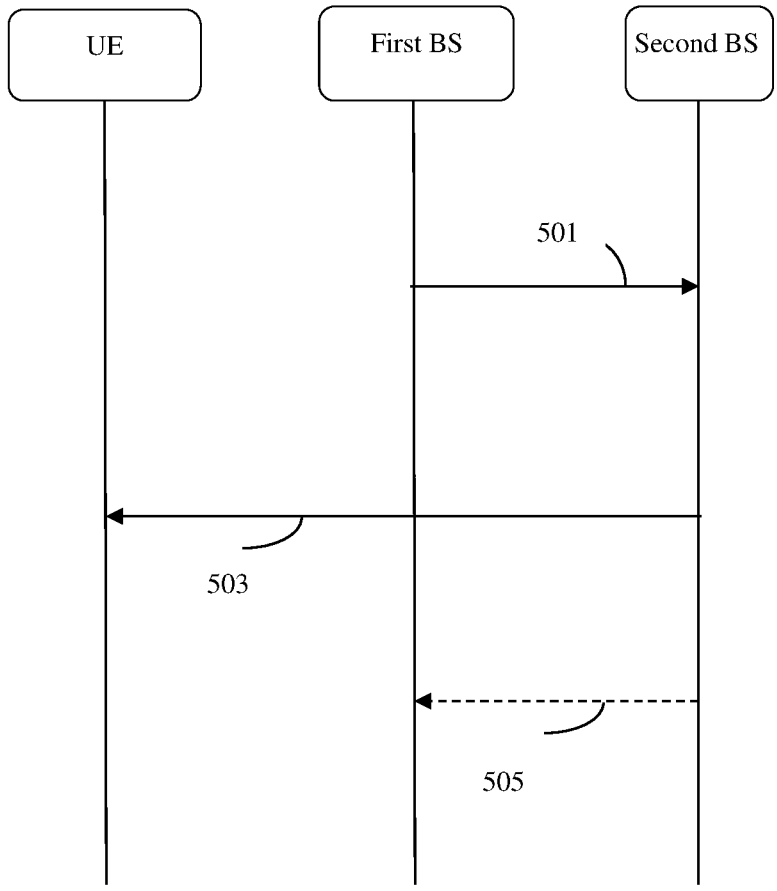
FIG. 5 illustrates an exemplary flow chart of a method for paging according to some embodiments of the present application.

FIG. 5 illustrates an exemplary flow chart of a method for paging according to some embodiments of the present application, wherein a RAN node, e.g., an anchor gNB will determine the UE grouping information. Although the method is illustrated in a system level by a UE in a remote side (or UE side) and two network nodes in a network side, e.g., a BS and its anchor BS, persons skilled in the art can understand that the method implemented in the remote side and that implemented in the network side can be separately implemented and incorporated by other apparatus with the like functions.

As shown in FIG. 5, in step 501, a first BS, e.g., a serving gNB of a UE may report information on UE paging grouping in the first BS to a second BS, e.g., an anchor gNB. The information on UE paging grouping may include at least one of the following: a capability on PEI, e.g., the capability on PEI of the first BS; a current PEI configuration information in a cell; a maximum number of UE groups in a cell; and a minimum number of UE groups in a cell. The cell is configured by the first BS in some embodiments of the present application.

In some embodiments of the present application, the second BS may also receive UE grouping configuration on a dedicated area from the CN. The second BS may direct use the received UE grouping configuration in the dedicated area and transmit the same to the first BS, or reconfigure the UE grouping configuration in the dedicated area and transmit the same to the first BS.

In step 503, the second BS may determine the UE grouping information and transmit the UE grouping information to the UE over a dedicated area, e.g., a RNA area. According to some embodiments of the present application, the UE grouping information indicates UE group ID information or UE group set information of UEs in a dedicated area.

In some embodiments of the present application, the second BS may also transmit suggestion information (or restriction information) on the UE grouping information to the first BS in step 505. The suggestion information may include at least one of: suggested PEI configuration information in a cell, a suggested maximum number of UE groups in a cell and a suggested minimum number of UE groups in the cell. The first BS may determine the number of UE groups indicated by PEI etc. based on the suggestion information. In the case that the first BS has a paging message for UEs, the first BS may determine the number of UE groups indicated by PEI and the PEI value, and then transmit the paging message.

In another exemplary scenario, the maximum number of UE groups in a dedicated area, e.g., a RNA, TA or cell may be limited to allocate one or more UE groups to a dedicated performance with a large number of UEs. Otherwise, the network will allocate lots of UE groups to a few UEs, while allocate a few UE groups to many UEs, which is not efficient for reducing false UE paging alarm. In other words, a reasonable mapping between UEs and UE groups is desirable.

According to some embodiments of the present application, the reasonable mapping between UEs and UE groups is achieved based on statistic information (or distribution information) of UE characteristic, the AMF or gNB will determine PEI configuration based on the statistic information and give a reason mapping between UEs and paging groups. In some embodiments of the present application, the statistic information may include at least one number of UEs in at least one of a power saving mode, in an inactive mode, in an idle mode, and in a paging probability zone in a dedicated area. For example, the statistic information may include a number of UEs in an inactive mode, or a number of UEs in an idle mode, or a number of UEs in an inactive mode and UEs in an idle mode etc. In some other embodiments of the present application, the statistic information may include at least one percent of UEs in at least one of a power saving mode, in an active mode, in an idle mode, and in a paging probability zone in a dedicated area. For example, the statistic information may include a percent of UEs in an inactive mode and a percent of UEs in an idle mode, or a percent of UEs in a paging probability zone in a dedicated area etc. In some yet other embodiments of the present application, the statistic information may include at least one level of UEs in at least one of a power saving mode, in an active mode, in an idle mode, and in a paging probability zone in a dedicated area. The level may be high and low; high, middle and low; or manners. For example, the statistic information may include: the number or percent of UEs in an inactive mode is high, and the number or percent of UEs in an idle mode is low etc.

Figure 6:
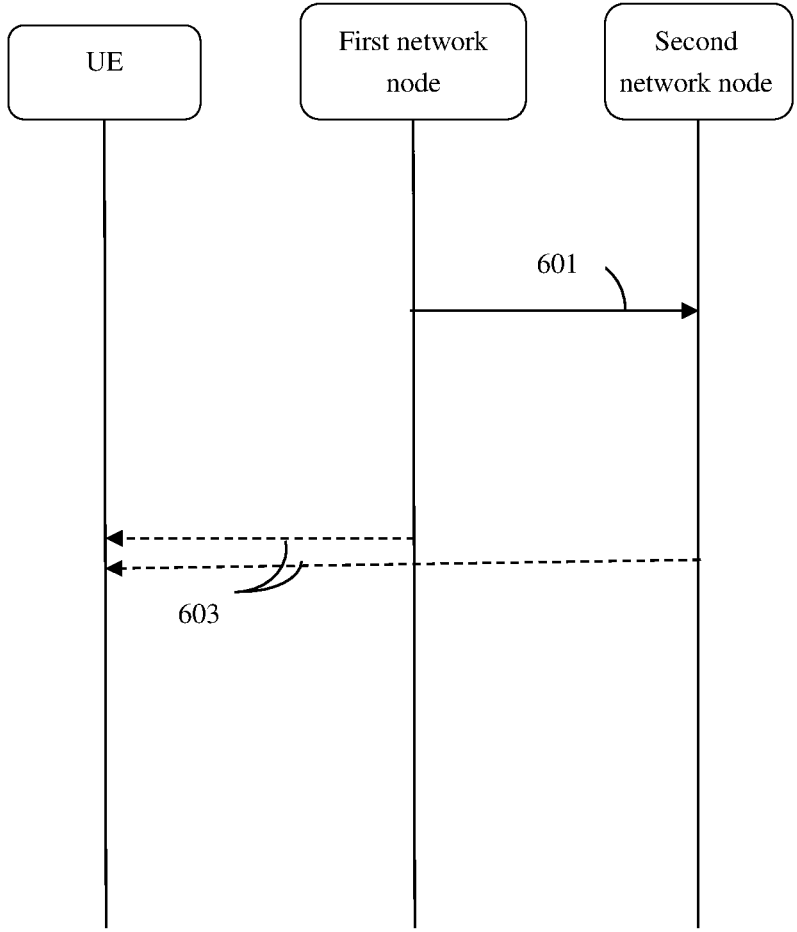
FIG. 6 illustrates an exemplary flow chart of a method for paging according to some embodiments of the present application.

FIG. 6 illustrates an exemplary procedure of a method for paging according to some embodiments of the present application. Although the method is illustrated in a system level by a UE in a remote side (or UE side) and two network nodes in a network side, persons skilled in the art can understand that the method implemented in the remote side and that implemented in the network side can be separately implemented and incorporated by other apparatus with the like functions.

As shown in FIG. 6, a first network node may transmit statistic information of UE characteristic to a second network node in step 601. In some embodiments of the present application, the first network node is a CN function entity, e.g., an AMF, and the second network node is a RAN node, e.g., an anchor BS. For example, the AMF transmits the statistic information to the anchor BS, which includes the number (or the percent or the level) of UEs in a power saving mode, in an inactive mode, in an idle mode, or in a dedicated paging probability zone in a dedicated, e.g., a RNA or TA. The anchor BS will determine the PEI configuration based on the statistic information received from the CN function entity, e.g., the AMF. In some other embodiments of the present application, the first network node is a BS, while the second network node is an anchor BS of the BS. For example, the BS transmits the statistic information to the anchor BS, which includes the number (or the percent or the level) of UEs in a power saving mode, in an inactive mode, in an idle mode, or in a dedicated paging probability zone in a dedicated area, e.g., a RNA or cell. The anchor BS will determine the mapping of the UE characteristic and the UE groups indicated by the PEI configuration based on the statistic information. In some yet other embodiments of the present application, the first network node is an anchor BS, while the second network node is a CN function entity, e.g., an AMF. For example, the anchor BS transmits the statistic information to the AMF, which includes the number (or the percent or the level) of UEs in a power saving mode, in an inactive mode, in an idle mode, or in a dedicated paging probability zone in a dedicated area. The AMF will determine the mapping of the UE characteristic and the UE groups indicated by the PEI configuration based on the statistic information.

In step 603, at least one of the first network node and the second network node may transmit UE grouping information to UEs. For example, the first network node is a CN function entity, e.g., an AMF, and the second network node is a RAN node, e.g., an anchor BS; or the first network node is a RAN node, e.g., an anchor BS, and the second network node is CN function entity, e.g., an AMF; or the first network node is a BS, while the second network node is an anchor BS of the BS. They can both transmit UE grouping information to UEs, or only one of them transmits UE grouping information to UEs.

In another exemplary scenario, the UE grouping information may be separately configured for the UEs in an inactive mode and the UEs in an idle mode. For example, UEs in RRC_IDLE are grouped separately from those in RRC_INACTIVE. Accordingly, unnecessary RAN paging reception by UEs in an idle mode can be avoided when the UEs can know in advance that the paging message includes only RAN paging, that is, the paging information does not include any CN paging. However, a UE may move to an idle mode by itself, which is not known by the network side.

According to some embodiments of the present application, in the case that a UE moves to an idle mode from an inactive mode, especially which is not known by the network side, the UE may disable the paging grouping mechanism. Accordingly, the UE will receive the CN paging always, or the UE will receive the CN paging and RAN paging always.

According to some other embodiments of the present application, the network side (e.g., a CN node and a gNB) configures separate group_ID indication information to UEs in an inactive mode and UEs in an idle mode, which is respectively referred to as group_ID indication information associated with an inactive mode and group_ID indication information associated with an idle mode. For example, the AMF determines the UE group ID information for UEs in an idle mode (even also for UEs in an inactive mode), and the gNB determines the UE group ID information for UEs in an inactive mode. The UE in an idle mode may detect the group_ID indication information associated with an idle mode in response to at least one of the following: the UE moves to an idle mode from an inactive mode, and a timer expires. That is, the UE in an idle mode will monitor (or detect) the group_ID indication information associated with an idle mode after the network does not receive RNA updating information and release UE AS context in the CN node. The timer is triggered in response to that the UE moves to the idle mode from the inactive mode, wherein the timer is a RNA timer or a timer configured by a network side, e.g., T380 plus an offset. Similarly, the UE in an inactive mode may detect the group_ID indication information associated with an inactive mode in response to at least one of the following: the UE moves to an inactive mode from an idle mode, and the timer is running or not expired. That is, the UE in an inactive mode will still monitor (or detect) the group_ID indication information associated with an inactive mode before the UE successfully triggers another procedure to connect to the network or before the expiry of the above mentioned timer or before the expiry of the RNA updating timer.

Embodiments of the present application also propose an apparatus for paging. For example, FIG. 7 illustrates a block diagram of an apparatus 700 for paging according to some embodiments of the present application.

Figure 7:
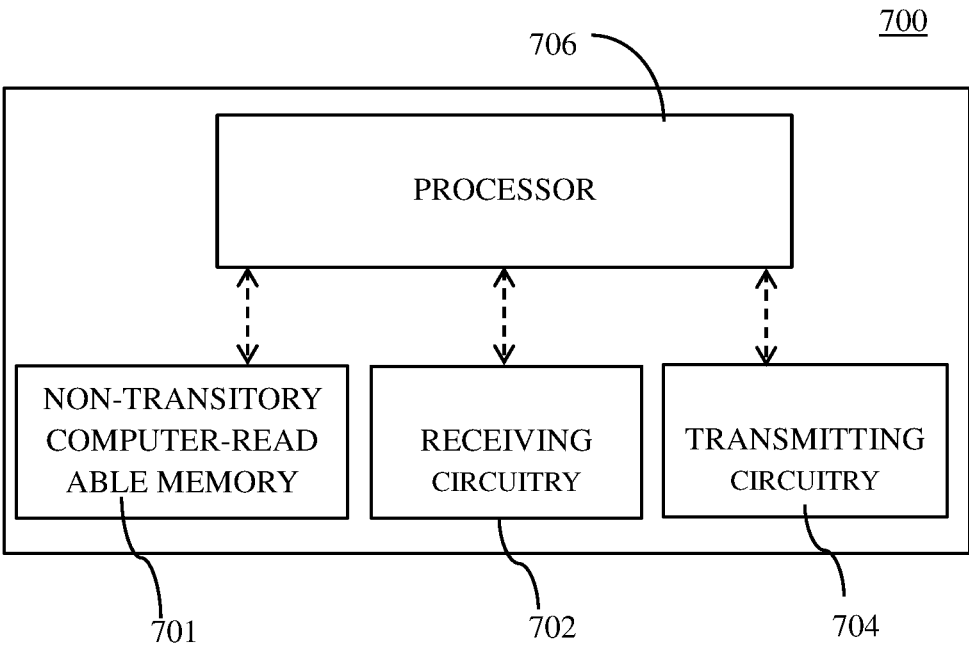
FIG. 7 illustrates a block diagram of an apparatus for paging according to some embodiments of the present application.

As shown in FIG. 7, the apparatus 700 may include at least one non-transitory computer-readable medium 701, at least one receiving circuitry 702, at least one transmitting circuitry 704, and at least one processor 706 coupled to the non-transitory computer-readable medium 701, the receiving circuitry 702 and the transmitting circuitry 704. The apparatus 700 may be a CN apparatus (e.g. an AMF or MME) configured to perform a method illustrated in FIGS.

3, 4 and 6 and the like, a network side apparatus (e.g., a BS) configured to perform a method illustrated in FIGS. 3-6 and the like, or a remote unit (e.g., a UE) configured to perform a method illustrated in FIGS. 2 and 4-6 or the like.

Although in this figure, elements such as the at least one processor 706, transmitting circuitry 704, and receiving circuitry 702 are described in the singular, the plural is contemplated unless a limitation to the singular is explicitly stated. In some embodiments of the present application, the receiving circuitry 702 and the transmitting circuitry 704 can be combined into a single device, such as a transceiver. In certain embodiments of the present application, the apparatus 700 may further include an input device, a memory, and/or other components.

For example, in some embodiments of the present application, the non-transitory computer-readable medium 701 may have stored thereon computer-executable instructions to cause a processor to implement the method with respect to the UE as described above. For example, the computer-executable instructions, when executed, cause the processor 706 interacting with receiving circuitry 702 and transmitting circuitry 704, so as to perform the steps with respect to the UE depicted in FIGS. 2 and 4-6.

In some embodiments of the present application, the non-transitory computer-readable medium 701 may have stored thereon computer-executable instructions to cause a processor to implement the method with respect to the BS as described above. For example, the computer-executable instructions, when executed, cause the processor 706 interacting with receiving circuitry 702 and transmitting circuitry 704, so as to perform the steps with respect to the BS depicted in FIGS. 3-6.

In some embodiments of the present application, the non-transitory computer-readable medium 701 may have stored thereon computer-executable instructions to cause a processor to implement the method with respect to the function entity of the CN as described above. For example, the computer-executable instructions, when executed, cause the processor 706 interacting with receiving circuitry 702 and transmitting circuitry 704, so as to perform the steps with respect to the CN depicted in FIGS. 3, 4 and 6.

Persons skilled in the art should understand that in some embodiments of the present application, "whether" means to do and or not to do, or means to be and/or not to be.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus including a processor and a memory. Computer programmable instructions for implementing a method stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A user equipment (UE) for wireless communication, comprising:

at least one memory; and at least one processor coupled with the at least one memory and configured to cause the UE to:

receive UE grouping information configured by a network node, the UE grouping information indicating UE group identity (ID) information of one or more UEs in an inactive mode and one or more UEs in an idle mode, wherein the UE grouping information is commonly configured for the one or more UEs in the inactive mode and the one or more UEs in the idle mode; and detect, in response to a paging grouping mechanism being enabled for the UE and based at least in part on the UE grouping information, group_ID indication information carried in at least one of paging physical downlink control channel (PDCCH) or paging early indication (PEI).

2. The UE of claim 1, wherein the UE grouping information indicates the UE group ID information by indicating range information of UEs in a number of UE groups.

3. The UE of claim 2, wherein the UE grouping information indicates at least one number range [x y] for UEs associated with a UE characteristic in the number of UE groups, and wherein the UE group ID information of the UE is computed based on a formulation [floor(x*N), floor(y*N)], wherein $0 \le x < y \le 1$, both x and y are present in decimal or percent, and N is the number of UE groups and is an integer equal to or larger than 1.

4. The UE of claim 2, wherein the UE grouping information indicates a range set $(x_1, \ldots x_m)$ of at least one range unit $[x_1\ x_2] \ldots$ and $[x_{m-1}\ x_m]$ for UEs associated with a UE characteristic in the number of UE groups, and wherein the UE group ID information or UE group set information of the UE is computed by at least one of:

floor[0, $x_1$*N), floor[$x_1$*N, $x_2$*N), . . . , floor[$x_{m-1}$*N, $x_m$*N), and floor[$x_m$*N, 1*N];

floor[$x_1$*N, $x_2$*N), . . . , floor[$x_{m-1}$*N, $x_m$*N), and floor [$x_m$*N, 1*N];

floor[0, $x_1$*N), floor[$x_1$*N, $x_2$*N), . . . , and floor[$x_{m-1}$*N, $x_m$*N]; and floor[$x_1$*N, $x_2$*N), . . . , and floor[$x_{m-1}$*N, $x_m$*N], wherein, $0<=x_1$, . . . $x_m<=1$, and $x_1$, . . . $x_m$ are present in decimal or percent, N is the number of UE groups, and both m and N are integer equal to or larger than 1.

5. The UE of claim 1, wherein the at least one processor is further configured to cause the UE to:

disable the paging grouping mechanism in response to the UE moving to the idle mode from the inactive mode.

6. The UE of claim 1, wherein the at least one processor is further configured to cause the UE to:

apply, in response to UE grouping information in a cell being received, the UE grouping information in the cell.

7. The UE of claim 1, wherein the at least one processor is further configured to cause the UE to compute the UE group ID information of the UE in a cell based on a mapping rule, wherein the mapping rule is of UE characteristic to UE groups in the cell and indicates a mapping order, and wherein the mapping order is row first or column first.

8. The UE of claim 1, wherein the UE grouping information indicates UE group ID information of UEs in a dedicated area, and wherein the dedicated area comprises one or more of a cell-specific area, a base station (BS)-specific area, a radio access network (RAN)-specific area, tracking area (TA)-specific area, or a public land mobile network (PLMN)-specific area.

9. A base station for wireless communication, comprising:

at least one memory; and at least one processor coupled with the at least one memory and configured to cause the base station to:

receive information on user equipment (UE) paging grouping from a network node; and transmit UE grouping information, the UE grouping information indicating UE group identity (ID) information of one or more UEs in an inactive mode and one or more UEs in an idle mode, wherein the UE grouping information is commonly configured for the one or more UEs in the inactive mode and the one or more UEs in the idle mode.

10. The base station of claim 9, wherein the UE grouping information indicates the UE group ID information by indicating range information of UEs in a number of UE groups.

11. The base station of claim 9, wherein the at least one processor is further configured to cause the base station to one or more of receive or transmit statistic information, wherein the statistic information comprises at least one of:

at least one number of UEs in at least one of a power saving mode, in the inactive mode, in the idle mode, and in a paging probability zone in a dedicated area;

at least one percent of UEs in at least one of a power saving mode, in the inactive mode, in the idle mode, and in a paging probability zone in a dedicated area; or at least one level of UEs in at least one of a power saving mode, in the inactive mode, in the idle mode, and in a paging probability zone in a dedicated area.

12. A processor for wireless communication, comprising:

at least one controller coupled with at least one memory and configured to cause the processor to:

receive user equipment (UE) grouping information configured by a network node, the UE grouping information indicating UE group identity (ID) information of one or more UEs in an inactive mode and one or more UEs in an idle mode, wherein the UE grouping information is commonly configured for the one or more UEs in the inactive mode and the one or more UEs in the idle mode; and detect, in response to a paging grouping mechanism being enabled for a UE and based at least in part on the UE grouping information, group ID indication information carried in at least one of paging physical downlink control channel (PDCCH) or paging early indication (PEI).

13. The processor of claim 12, wherein the UE grouping information indicates the UE group ID information by indicating range information of UEs in a number of UE groups.

14. A method performed by a user equipment (UE), the method comprising:

receiving UE grouping information configured by a network node, the UE grouping information indicating one or more of UE group identity (ID) information or UE group set information of one or more UEs in an inactive mode and one or more UEs in an idle mode, wherein the UE grouping information is commonly configured for the one or more UEs in the inactive mode and the one or more UEs in the idle mode; and detecting, if that in response to a paging grouping mechanism being enabled for the UE and based at least in part on the UE grouping information, group_ID indication information carried in at least one of paging physical downlink control channel (PDCCH) or paging early indication (PEI).

15. The method of claim 14, wherein the UE grouping information indicates the UE group ID information by indicating range information of UEs in a number of UE groups.

16. The method of claim 15, wherein the UE grouping information indicates at least one number range [x y] for UEs associated with a UE characteristic in the number of UE groups, and wherein the UE group ID information of the UE is computed based on a formulation [floor(x*N), floor (y*N)], wherein $0<=x<y<=1$, both x and y are present in decimal or percent, and N is the number of UE groups and is an integer equal to or larger than 1.

17. The method of claim 15, wherein the UE grouping information indicates a range set ($x_1$, . . . $x_m$) of at least one range unit [$x_1$ $x_2$] . . . and [$x_{m-1}$ $x_m$] for UEs associated with a UE characteristic in the number of UE groups, and wherein the UE group ID information of the UE is computed by at least one of:

floor[0, $x_1$*N), floor[$x_1$*N, $x_2$*N), . . . , floor[$x_{m-1}$*N, $x_m$*N), and floor[$x_m$*N, 1*N];

floor[$x_1$*N, $x_2$*N), . . . , floor[$x_{m-1}$*N, $x_m$*N), and floor [$x_m$*N, 1*N];

floor[0, $x_1$*N), floor[$x_1$*N, $x_2$*N), . . . , and floor[$x_{m-1}$*N, $x_m$*N]; and floor[$x_1$*N, $x_2$*N), . . . , and floor[$x_{m-1}$*N, $x_m$*N], wherein, $0<=x_1$, . . . $x_m<=1$, and $x_1$, . . . $x_m$ are present in decimal or percent, N is the number of UE groups, and both m and N are integer equal to or larger than 1.

18. The method of claim 14, further comprising:

disabling the paging grouping mechanism in response to the UE moving to the idle mode from the inactive mode.

19. The method of claim 14, further comprising:

applying, in response to UE grouping information in a cell being received, the UE grouping information in the cell.

20. The method of claim 14, further comprising:

computing the UE group ID information of the UE in a cell based on a mapping rule, wherein the mapping rule is of UE characteristic to UE groups in the cell and indicates a mapping order, and wherein the mapping order is row first or column first.

\* \* \* \* \*